3,340,003
PROCESS FOR PRODUCING HIGH PURITY
ALKALINE EARTH COMPOUNDS
George G. Judd, Woodville, Ohio, assignor to Ohio Lime Company, Woodville, Ohio, a corporation of Ohio
Filed June 1, 1965, Ser. No. 460,062
18 Claims. (Cl. 23—66)

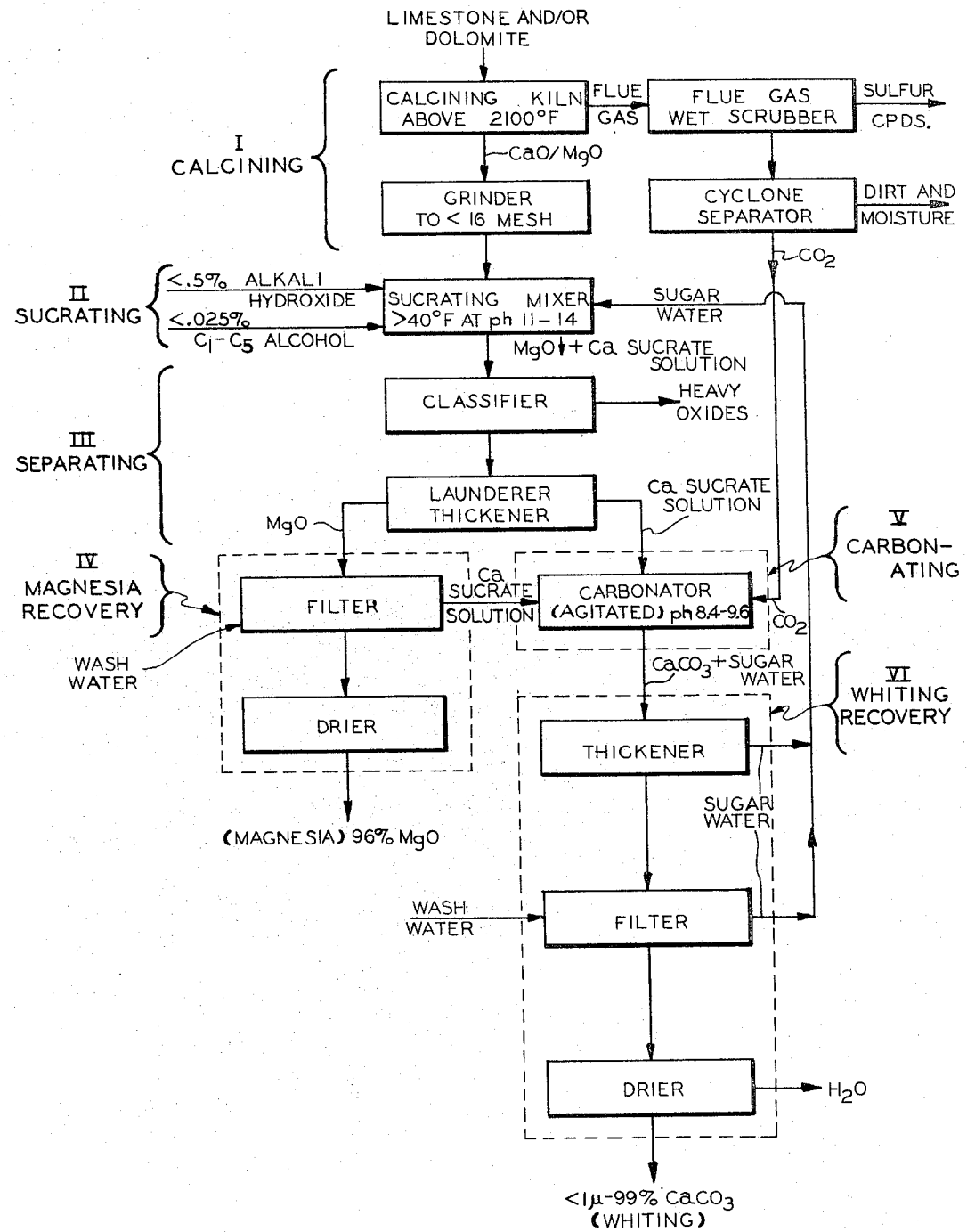

ABSTRACT OF THE DISCLOSURE

The process of this invention comprises the steps of calcining a dolomite to form substantially only oxides and then grinding the calcined product sufficiently fine to quickly react with an aqueous sugar solution to change all the calcium oxide to a soluble calcium sucrate and separate the magnesia. This sucrating step is carried out at a pH between about 11 and 14 in the presence of less than 0.5% hydroxide and less than 0.025% of a $C_1$-$C_5$ mono-hydroxy alcohol to aid in the separation of high purity small particle size magnesia. This magnesia precipitate then can be separated readily from the calcium sucrate solution and the undesired metal oxides by classifying, filtering and drying so that the resulting magnesia needs no further calcining. The remaining calcium sucrate is then treated to a pH between about 8.4 and 9.6 with carbon dioxide, such as from the first calcining step, to insure a small particle size high purity calcium carbonate precipitate which is separated from the resulting sugar solution (which may be re-cycled), and then dried to form a high purity whiting.

---

This invention relates to a process for the production of small particle size high purity magnesium oxide and/or calcium carbonate from high or low quality magnesium and/or calcium containing compounds or ores, such as the carbonates and/or oxides of calcium and/or magnesium, such as dolomites.

More particularly, this process relates to an improved process for the selective solubility of lime by sugar solution under specific controlled conditions to obtain the above two mentioned products, which products may be used directly without further refining. For example: the magnesium oxide may be burned directly to periclase or its β form for the manufacture of refractories, which are particularly important in present processes for the production of steel especially when pure oxygen is used therefor. The calcium carbonate may be made very fine and of good enough whiteness for use directly as a pigment and/or filler in tooth paste, paper, paint, plastic, and the like.

It is an object of this invention to produce an efficient, effective, economic, simple and rapid process for the production of at least 98% pure magnesium oxide having a particle size of 10 microns or less and/or at least 99% pure calcium carbonate having a particle size of 1 micron or less and a brightness of at least 94 out of a possible 100, from their corresponding natural or other alkaline earth carbonates and/or oxides.

Another object is to carry out such a process for selective solubility of lime by sugar solution with new techniques and controls to produce directly such high purity magnesia and whiting.

Another object is to carry out such a calcium sucrate separation process without hydration, without the addition of heat, without inversion of the sugar solution, without the formation of bicarbonates and without a second calcining of the products.

Another object is to provide such an improved calcium sucrate separation process in which substantially all of the calcium therein is converted in the sugar solution.

Another object is to calcine dolomite so as to remove substantially all the sulfur impurities before the calcium separation by the sugar solution treatment.

Another object is to provide such a calcium sucrate separation process in which the impurities in the dolomites treated, such as silicon dioxide and the three valence metal oxides, including aluminum, iron, cobalt, nickel, and manganese oxides, are also removed.

Another object is to carry out such a calcium sucrate separation process in which the formation of calcium bicarbonates and calcium oxides during the process are substantially prevented.

Another object is to carry out such a calcium sucrate separation process under controlled pH conditions for more complete re-carbonation of the resulting sugar solution to separate pure calcium carbonate and to control and obtain its finer particle size, to prevent inversion of the sugar in the solution, and thus to obtain also a greater capacity of the sugar solution to dissolve calcium oxide upon its re-cycle.

Another object is to add a slight amount of a lower alcohol to the sugar solution in such a process to aid the coagulation of the magnesium oxide and speed up the reaction of the calcium oxide with the sugar solution.

Generally speaking, the process of this invention comprises calcining the dolomitic product or raw material at a predetermined temperature to form substantially only oxides and then grinding the resulting product to a relatively small particle size so it can be quickly reacted directly with an excess amount of aqueous sugar solution to react with substantially all of the calcium oxide to form a water soluble calcium sugar compound including calcium sucrate and to separate as a suspension or a precipitate all the magnesium oxide. The resulting liquid suspension is then classified to remove first of all the heavy insoluble impurities such as silicates and oxides of aluminum and iron and the like, and then to remove the fine suspended magnesium oxide by a thickener or launderer and filter to separate the calcium sucrate solution from the magnesium oxide or magnesia, which magnesia is then dried. The calcium sucrate solution decanted from the launderer or thickener and removed from the filter, is then reacted with purified carbon dioxide gas, which may be obtained from the calcining of the original dolomite, with continuous agitation at a controlled pH to prevent the formation of bicarbonates that would contaminate the sugar solution upon its re-cycle, and to insure the particle size of the calcium carbonate precipitated to be less than about 1 micron. The resulting calcium carbonate or whiting may then be removed by thickening, filtering, washing, and drying, while the regenerated sugar solution is then re-cycled for further mixing with the ground calcined oxides.

The chemical reactions in this process are as follows:

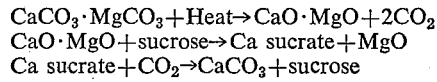

The above mentioned and other features and objects of this invention and the manner of attaining them will become more apparent and the invention itself will be understood best by reference to the following detailed description of the invention taken together with specific examples thereof in conjunction with the accompanying drawing of a schematic block flow diagram of the steps in the process of this invention.

I. CALCINING

Referring specifically to the drawing, the first step in this process includes the introduction of the raw material into a kiln for calcining. This raw material may be any natural calcium and/or magnesium rock such as limestone, dolomite, aragonite, magnesite, brucite, etc., or other material containing magnesium and calcium carbonates and/or oxides which is crushed or broken into pieces suitable for feeding to a calcining kiln.

The calcining of such a raw material, and especially a natural dolomite material is preferably carried out between the temperatures of 2100° F. and 2600° F. preferably above about 2450° F. in order to remove any and all of the sulfates and other sulfur compounds which may be present therein, and to break such compounds down into their respective oxides.

The carbon dioxide in the flue gases from the calcining kiln, which is driven off from the carbonates, may be and preferably is recovered for use later in the process, by passing the flue gases through a wet scrubber for the removal of the sulfur compounds and then through a mechanical separator, such as a cyclone, to remove any moisture or solid particles left by the scrubber.

The resulting calcined product is then ground in a hammer or impact mill, so it will all pass through a sieve having a mesh of not greater than about 16 (about 1000 micron size maximum) and preferably smaller, thus insuring small particle size for a quicker reaction of CaO and better suspension of the MgO in the next steps of this process. The ground particles which are of too large a size may be separated by a screen and/or an air classifier and returned for further grinding. The resulting fine calcined product comprising MgO·CaO dust may be stored before being fed to the next step in this process. Also such MgO·CaO dust from any dolomitic ore burning kiln may be used as the feed for the next step of this process.

II. SUCRATING

The resulting ground calcined material or dust, which should be at ambient temperature, preferably at a temperature between about 70° and 100° F. but in any event not below about 40° F. or above 140° F. which is the inversion temperature of sucrose. This material is then mixed directly with sugar water which may contain between about 5 and 50% by weight of sucrose, such as beet, cane or maple sugar, molasses, or the like and preferably between about 10 and 15% by weight of sucrose. This sugar water is added in an amount in excess of about 1½ to 2 times the stoichiometric amount that is needed for reacting with all the calcium in the material treated in order to speed settling of the unreacted MgO in the dust. This stoichiometric amount may be determined by the analysis of a sample of the calcined material before the sugar water is added to it. This mixing or sucrating step is preferably carried out in a vat or chamber with agitation by paddles or propeller stirrers in order to obtain and maintain small size particles of the magnesium oxide, that is about 40 microns or less, which MgO is not reacted and is to be kept now in suspension in the resulting solution. This mixing also speeds the reaction of the sucrose or sugar with the calcium oxide to form a water soluble calcium sucrate from the MgO·CaO particles which are broken down by this reaction to form the small MgO particles in suspension. The reactants may be both continuously fed into one end of the vat or chamber and continuously removed from another end thereof, since the reaction is substantially immediate because of the initial small particle size of the MgO·CaO dust.

If necessary the mixture may be heated or chilled, such as by heat transfer coils in or a jacket around the mixing vat or chamber, through which coils or jacket a heat transfer fluid may be circulated, such as water. This may be done during this reaction step in order to prevent any hydrolysis of the calcium oxide to form calcium hydroxide, as well as to prevent inversion of the sugar in the sugar solution.

To this mixing step there may be added, in order to control the pH of the solution now and later in the process, as well as to improve the settling time and to speed the calcium sucrate reaction and later promote its more complete carbonation, a small percentage of an alkali metal hydroxide, such as sodium hydroxide or potassium hydroxide, in amount of between about .05 and .5% by weight of the solution.

Furthermore in this step there also may be added to the sugar solution a small amount of a sufficiently water soluble organic hydroxide or alcohol, such as methyl, ethyl, propyl, butyl or amyl alcohol, or their corresponding ether, aldehydes or ketones. Since these ethers, aldehydes and ketones break down in basic solutions such as the present solution to produce hydroxy ions, it is these hydroxy ions which increase the coagulation of the magnesium oxide as well as improve the speed of the solubility of the calcium sucrate which is formed in the process. The percent of this organic alcohol in the sugar solution however is relatively small, preferably in the range between the 0.01 and 0.025% by weight of the solution. Tests have shown that such small percentages of alcohol increase the speed of the action about twice that of what it would be if the alcohol and/or alkali metal hydroxide were not added.

III. SEPARATING

From the sucrating step in the reaction chamber or vat for the MgO·CaO dust and sugar water, the resulting calcium sucrate solution suspending insoluble MgO particles are passed into a classifier, which may be of a drag or screw type, from which the larger particle sized (i.e. in excess of about 40 microns) and/or heavier insoluble products, such as the silicates and three valence metal oxides, are removed. These insoluble heavy impurities include silicon dioxide, and aluminum, iron, manganese, cobalt, and nickel oxides, all or any of which may occur in the natural raw material in varying amounts. Since these oxides are in particles usually larger and always heavier than the magnesium oxide, they are selectively removed in such a classifier without the removal of the magnesium oxide, which MgO is in particles of less than about 10 microns, and mostly about a micron in size and therefore easily remains in suspension in the sugar solution. Any solution remaining with these removed impurities may be recovered, and returned to the classifier or following thickener, before the impurities are discarded.

The resulting sucrate solution suspension after the heavier impurities are removed is then passed through a thickener, flocculator, or launderer in which the previously suspended magnesium oxide is permitted to settle, which settling is aided and speeded by the above mentioned alkali metal hydroxide and alcohol present in the solution. This thickener increases the solid content of the solution from about 1% to about 40% by weight. The clear calcium sucrate solution is then decanted or drawn off while the resulting thick or pasty suspension of about 40% solids of substantially pure magnesium oxide is removed for recovery. The decanted calcium sucrate solution is then passed on to the carbonator described in part V below.

IV. MAGNESIA RECOVERY

The resulting magnesium oxide from the launderer or thickener is then pumped or passed to be filtered, such as on a drum filter, and recovered as a cake which may be blown and/or scraped therefrom. This cake may be also washed with water before its removal. The sucrate solution and wash water is preferably returned to the process either to the thickener or to the carbonating step described below. The removed magnesia cake is preferably dried in a drier below about 1000° F. to prevent it from becoming hydrated by any retained moisture, formed into bricks, and/or packaged for shipment or use, or shipped in bulk, as desired.

V. CARBONATING

The sugar solution which is removed or decanted from the thickener launderer, as well as that removed from the first filter of the magnesium oxide, may then be pumped or passed into a carbonator which may be a vessel with agitation, or pumped to the top of an absorption tower scrubber where it falls down over packing, for carbonation of the calcium sucrate to form immediately calcium carbonate by reacting with pure carbon dioxide bubbled therein. Agitation during this step is important for maintaining a small particle size of the resulting precipitated calcium carbonate. The purer the carbon dioxide, the better the whiteness or brightness of the precipitated $CaCO_3$. This carbon dioxide may be obtained by purification of the flue gas from the calcination step I above, or from any other source.

This carbonating step usually takes about 20 minutes and is carried out at a closely controlled pH between about 9.6 and 8.4, and preferably at about 9.2, which pH is maintained by controlling, preferably automatically by a pH meter at the outlet of the carbonator, the rate or amount of $CO_2$ which is introduced into the carbonator. This pH prevents inversion of the sugar, controls the particle size of the $CaCO_3$ produced, and prevents the formation of bicarbonates which otherwise would increase the lime impurity in the MgO on recycle of the sugar solution.

The pH of the solution, however, before being carbonated from the thickener is between about 11 and 14 and preferably between about 11.5 and 12.

VI. WHITING RECOVERY

The calcium carbonate obtained from the carbonator is then passed through a thickener or launderer, where the pH is also closely controlled between about 9.6 and 8.4, for thickening the precipitated pure calcium carbonate, as for the MgO in step III above. The resulting $CaCO_3$ slurry is passed through a filter, which may be of the drum type as before, upon which the $CaCO_3$ may then be washed with water. The resulting removed and regenerated sugar solution may then have sugar made up therein, if necessary, before being returned to the sucrating step II mentioned above. Also make-up sugar may be added as raw sugar or a concentrated solution thereof, to the mixer of this step II, as well as make-up water, as required. However, make-up water may also or alternately be added to the following classifying step III.

The final fines (1 micron or less particle size) calcium carbonate or whiting is dried at below about 1000° F. such as in a fluid drier, and then may be packaged, or shipped in bulk, for use directly as fillers for paper, toothpaste, paint pigments, cigarette paper and the like.

Example I

A dolomitic lime product having the following analysis was treated according to the above process as follows:

| | Percent by wt. |
|---|---|
| $CaCO_3$ | 53.45 |
| $MgCO_3$ | 45.38 |
| $SO_3$ | .25 |
| $SiO_2$ | .09 |
| $R_2O_3$ | [1] .30 |
| C | .30 |
| Other impurities | Traces |

[1] R = a metal, such as Al, Fe, Co, Ni, Mn.

This product was then burned at 2000° F. in a shaft kiln which takes about three days and then the resulting product was passed through a hammermill after which the broken particles were separated over at least a 16 mesh screen, the particles which did not pass the screen being returned to the hammermill for further pulverization.

12 grams of the resulting burned oxide or lime had an analysis as follows:

| | Percent by wt. |
|---|---|
| $SiO_2$ and acid insolubles | .220 |
| $R_2O_3$ | .316 |
| $SO_3$ | .503 |
| CaO | 55.19 |
| MgO | 41.44 |
| Loss on ignition | 1.88 | was then admixed with 500 milliliters of water containing 67.4 grams of sucrose and .01% by weight of denatured alcohol and .05% by weight of sodium hydroxide. After mixing for about 5 minutes the solution was tested to have a pH of about 11.9. This mixture was allowed to settle and in 5 minutes the 580 milliliters of solution settled to 400 milliliters and after about 22 minutes it had settled to 60 milliliters, after 25 minutes to 50 milliliters, and after 45 minutes to 45 milliliters. The resulting calcium sucrose was decanted off the solution and the settled particles of magnesium oxide and impurities were passed through a screen 325 mesh per inch on which .2163 gram of residue remained, which was primarily the silicon dioxide and $R_2O_3$ as well as the larger particles of calcium and magnesium hydroxide. The resulting composition of what remained on the screen was as follows.

| | Percent by wt. |
|---|---|
| Silicon and $R_2O_3$ | 3.93 |
| Calcium oxide | 23.64 |
| Magnesium oxide | 62.18 |
| $SO_3$ | 7.18 |
| Undetermined | 3.07 |

The sample which passed through the screen was then filtered and dried until it contained only 35% by weight moisture. The filtered sample contained:

| | Percent by wt. |
|---|---|
| Silicon dioxide and $R_2O_3$ | 1.08 |
| Calcium oxide | 0.83 |
| Magnesium oxide | 97.30 |
| Undetermined | 0.79 |

The solution which was drawn off and removed from the filter in the previous steps comprising the calcium sucrate, was then reacted at a pH of 11.9 by bubbling carbon dioxide through it until the pH reached 9.2 and then it took about 10 minutes for the calcium carbonate to precipitate.

This calcium carbonate precipitate was then removed by filtering, and then washing the filtered precipitate with water about equal to the weight of the water in the filter cake. The resulting washed precipitate was then dried in an oven for one half hour at about 300° F. and then was tested to be at least 99.9% by weight calcium carbonate or whiting having an average particle size of about 1 micron.

Example II

Another sample of the same dolomitic lime starting material for Example I above was burned at 2600° F. in a rotary kiln, the resulting calcined material from which was then passed through a hammermill, and then through at least 16 mesh screen. The resulting calcined product which passed this screen had the following composition:

| | Percent by wt. |
|---|---|
| $SiO_2$ and insolubles | .23 |
| $R_2O_3$ | .328 |
| $SO_3$ | .03 |
| CaO | 55.33 |
| MgO | 41.51 |
| Loss on ignition | .35 |

12 grams of these calcined fines were then admixed for about minutes with 510 milliliters of water containing 67.2 grams of sucrose, .01% by weight of denatured alcohol and .05% by weight of sodium hydroxide, which solution was tested to have a pH of about 11.9. 500 milliliters of this suspension was then allowed to settle, and after 5 minutes it settled to 385 milliliters, after 10 minutes to 215 milliliters, after 15 minutes to 128 milliliters, and after 20 minutes to 60 milliliters. The calcium sucrate solution was then decanted therefrom, and then the remaining particles or precipitate was filtered and still contained 23.83% moisture. This moist precipitate was then dried in an oven for half hour at about 300° F. and determined to have a composition of:

| | Percent by wt. |
|---|---|
| SO$_2$ and insolubles | 0.50 |
| R$_2$O$_3$ | 1.08 |
| Calcium oxide | 2.11 |
| Magnesium oxide | 96.78 |

The decanted liquid solution from this mixture which still had a pH of about 11.9 was then agitated with carbon dioxide by bubbling carbon dioxide gas therethrough until the pH reached 9.2 at which time it took about 10 minutes for the resulting calcium carbonate formed to settle. This carbonate was then filtered, water washed, re-filtered again, and dried in an oven at about 300° F. for half an hour to produce whiting having a percentage purity of 99.9% by weight and a particle size of about one micron.

While there is described above the principles of this invention in connection with a specific process, it is to be clearly understood that this description is made only by way of example and not as a limitation to the scope of this invention.

What is claimed is:

1. In a process for treating a mixture containing calcium and magnesium oxides by:
   (a) mixing said oxide with an aqueous sugar solution containing between about 5% and 50% by weight of sugar to form a soluble calcium sugar compound and suspended therein particles of water insoluble magnesium oxide;
   (b) separating said calcium sugar compound in solution from said magnesium oxide;
   (c) reacting said calcium sugar solution with carbon dioxide to form an insoluble calcium carbonate and to re-form said aqueous sugar solution;
   (d) separating the resulting sugar solution from said calcium carbonate to produce substantially pure calcium carbonate, the improvement comprising:
      (1) carrying out the mixing of said oxide with said aqueous sugar solution in the presence of between about 0.01% and 0.025% by weight of a monohydroxy alcohol having from between 1 and 5 carbon atoms per molecule and being soluble in said aqueous sugar solution, and
      (2) carrying out said reaction of said calcium sugar solution at a pH between about 8.4 and 9.6.

2. A process for producing at least 98% pure magnesium oxide and at least 99% pure calcium carbonate having a particle size to about 1 micron, from natural alkaline earth carbonates and oxides containing impurities, comprising the steps of:
   (a) calcining the natural carbonates and oxides at a temperature of above about 2100° F. to remove any sulphate impurities which may occur therein,
   (b) pulverizing the resulting calcining material to less than about 16 mesh,
   (c) mixing the resulting pulverized material with an aqueous sugar solution of between about 5% and 50% by weight sugar, to form calcium sucrate and a water insoluble magnesium oxide,
   (d) adding to said aqueous sucrate solution between about .05 and .5% of an alkali metal hydroxide for controlling the pH of said sucrate solution to between about 11.0 and 14.0,
   (e) adding to said aqueous sucrate solution between about 0.01 and 0.025% by weight of a lower aliphatic alcohol soluble in said aqueous solution,
   (f) separating said calcium sucrate solution and magnesium oxide from said impurities,
   (g) separating said soluble calcium sucrate solution from said magnesium oxide,
   (h) reacting said calcium sucrate solution with carbon dioxide to form an insoluble calcium carbonate and to re-form said aqueous sugar solution, and carrying on said reaction at a pH between about 8.4 and 9.6,
   (i) separating the resulting sugar solution containing said alkali hydroxide and alcohol from said calcium carbonate, and
   (j) re-cycling said separated aqueous sugar solution to said mixing step to produce more calcium sucrate.

3. A process for producing magnesium oxide and calcium carbonate from natural alkaline earth carbonates and oxides containing impurities, comprising the steps of:
   (a) mixing said magnesium and calcium oxides with an aqueous sugar solution containing between about 5% and 50% by weight of sugar to form a soluble calcium sugar compound and suspended therein particles of water insoluble magnesium oxide, and carrying out said mixing in the presence of between about 0.01% and 0.025% by weight of a monohydroxide alcohol having from between 1 and 5 carbon atoms per molecule and being soluble in said aqueous sugar solution;
   (b) separating said calcium sugar compound solution from said insoluble magnesium oxide;
   (c) reacting said calcium sugar solution with carbon dioxide to form an insoluble calcium carbonate and to reform said aqueous sugar solution, and carrying out said reaction at a pH between about 8.4 and 9.6; and
   (d) separating the resulting sugar solution containing said alcohol from said insoluble calcium carbonate to produce a high purity calcium carbonate.

4. A process according to claim 3 including the step of re-cycling said separated aqueous sugar solution to said mixing step to produce more of said soluble calcium sugar compounds.

5. A process according to claim 3 wherein said mixing step is carried out at a temperature between about 40° and 140° F.

6. A process according to claim 3 wherein said aqueous sugar solution has a pH between about 11 and 14 during said mixing of said aqueous sugar solution with said oxides.

7. A process according to claim 3 wherein said aqueous sugar solution during said mixing step contains between about 0.05 and .025% by weight of an alkali metal hydroxide.

8. A process according to claim 3 wherein said separating of said sugar solution from said calcium carbonate comprises the steps of thickening and filtering.

9. A process according to claim 3 including the step of separating said impurities from said calcium sugar solution and said insoluble magnesium oxide before said step of separating said aqueous sugar solution from said insoluble magnesium oxide.

10. A process according to claim 3 comprising the preliminary step of calcining natural earth carbonates at a temperature between about 2100° and 2600° F. to form said oxides.

11. A process according to claim 10 including the step of pulverizing the resulting calcined material containing said oxides before mixing it with said aqueous sugar solution.

12. A process according to claim 10 wherein said calcining step is carried out to produce carbon dioxide, and wherein said carbon dioxide is employed for reacting with said soluble calcium sugar solution to produce said insoluble calcium carbonate.

13. A process according to claim 12 wherein said carbon dioxide is purified before being reacted with said soluble calcium sugar solution.

14. A process for producing magnesium oxide and calcium carbonate from natural alkaline earth carbonates and oxides containing impurities, comprising the steps of:
   (a) calcining the natural carbonates and oxides at a temperature above about 2100° F. to remove any sulphate impurities which may occur therein, (b) pulverizing the resulting calcined material to less than about 16 mesh,
(c) mixing the resulting pulverized material with an aqueous sugar solution of between about 5% and 50% sugar by weight to form a water soluble calcium sugar solution and suspended therein particles of water insoluble magnesium oxide, said solution having a pH between about 11 and 14,
(d) carrying out said mixing in the presence of between 0.01 and 0.025% by weight of a soluble lower aliphatic alcohol,
(e) separating said calcium sugar solution and said insoluble magnesium oxide particles from said impurities,
(f) separating said calcium sugar solution from said insoluble magnesium oxide particles,
(g) reacting the separated calcium sugar solution with carbon dioxide to form small insoluble substantially 99% pure calcium carbonate particles and to reform said aqueous sugar solution, and carrying out said reaction at a pH between about 8.4 and 9.6, and
(h) separating the resulting reformed aqueous sugar solution from said small pure calcium carbonate particles.

15. A process according to claim 14 including the step of adding to said aqueous sugar solution during its mixing step (c) between about 0.05 and 0.5% of an alkaline metal hydroxide for controlling said pH of said solution.

16. A process according to claim 14 wherein said calcining step is carried out at a temperature preferably above 2450° F.

17. A process according to claim 14 wherein said mixing step (c) is carried out at ambient temperature.

18. A process according to claim 14 wherein said aqueous sugar solution has a pH between about 11.5 and 12 during said mixing step (c).

References Cited

UNITED STATES PATENTS

| | | | |
|---|---|---|---|
| 2,143,773 | 1/1939 | Hart | 23—201 X |
| 2,143,774 | 1/1939 | Hart | 23—66 |
| 2,188,663 | 1/1940 | McClure et al. | 23—66 |
| 2,195,367 | 3/1940 | Hart | 106—61 |

OSCAR R. VERTIZ, *Primary Examiner.*

G. T. OZAKI, *Assistant Examiner.*

UNITED STATES PATENT OFFICE
CERTIFICATE OF CORRECTION

Patent No. 3,340,003 September 5, 1967

George G. Judd

It is hereby certified that error appears in the above numbered patent requiring correction and that the said Letters Patent should read as corrected below.

Column 6, line 67, before "minutes" insert -- 5 --.

Signed and sealed this 22nd day of October 1968.

(SEAL)
Attest:

Edward M. Fletcher, Jr.
Attesting Officer

EDWARD J. BRENNER
Commissioner of Patents